(12) United States Patent
Li et al.

(10) Patent No.: US 11,182,299 B2
(45) Date of Patent: Nov. 23, 2021

(54) DATA ACQUISITION METHOD, MICROPROCESSOR AND APPARATUS WITH STORAGE FUNCTION

(71) Applicant: AUTOCHIPS WUHAN CO., LTD., Wuhan (CN)

(72) Inventors: Mingyang Li, Wuhan (CN); Bin Zhang, Wuhan (CN)

(73) Assignee: AUTOCHIPS WUHAN CO., LTD., Wuhan (CN)

( * ) Notice: Subject to any disclaimer, the term of this patent is extended or adjusted under 35 U.S.C. 154(b) by 0 days.

(21) Appl. No.: 17/000,389

(22) Filed: Aug. 24, 2020

(65) Prior Publication Data

US 2021/0064534 A1    Mar. 4, 2021

(30) Foreign Application Priority Data

Aug. 28, 2019    (CN) .......................... 201910802257.1

(51) Int. Cl.
*G06F 12/0875*    (2016.01)

(52) U.S. Cl.
CPC .. *G06F 12/0875* (2013.01); *G06F 2212/1021* (2013.01); *G06F 2212/602* (2013.01)

(58) Field of Classification Search
CPC .................................................. G06F 12/0875

USPC ......................................................... 711/123
See application file for complete search history.

(56) References Cited

U.S. PATENT DOCUMENTS

| | | | | |
|---|---|---|---|---|
| 2005/0278714 A1* | 12/2005 | Vahid | ........................ | G06F 8/53 717/159 |
| 2008/0052534 A1* | 2/2008 | Harada | .................... | G06F 21/85 713/190 |

* cited by examiner

*Primary Examiner* — Jae U Yu

(57) ABSTRACT

The present application discloses a data acquisition method, a microprocessor and an apparatus with storage function. The method may include: a request information for obtaining a target information may be received. The request type of the request information may be an instruction request or a data request. The instruction cache and the data cache may be queried respectively, to determine whether the target information matching with the requested information exits in the instruction cache and the data cache. If the target information exists in another cache that does not match with the request type of the request information, then the target information may be returned from the cache that does not match with the request type of the request information. The present application may physically separate the instruction cache and the data cache, thereby improving the data acquisition efficiency.

20 Claims, 6 Drawing Sheets

DATA ACQUISITION METHOD, MICROPROCESSOR AND APPARATUS WITH STORAGE FUNCTION

CROSS REFERENCE TO RELATED APPLICATION

The present disclosure claims priority to Chinese Patent Application No. 201910802257.1 entitled "DATA ACQUISITION METHOD, MICROPROCESSOR AND APPARATUS WITH STORAGE FUNCTION" filed on Aug. 28, 2019, the contents of which are incorporated by reference in their entirety herein.

TECHNICAL FIELD

The present disclosure relates to a field of microprocessor, and in particular to a data acquisition method, a microprocessor and an apparatus with storage function.

BACKGROUND

The developments of microprocessors and memories have long been not very balanced, which lead to a huge performance gap therebetween. In 1980, an operating frequency of a typical microprocessor was 10 MHz, and an access time of a typical SDRAM (Synchronous Dynamic Random Access Memory) was 250 ns. Today's microprocessors run at frequencies of 100 MHz and even higher, which have increased by several orders of magnitude, while the access time of the SDRAM has just increased by about an order of magnitude. The access speed to the main memory becomes a bottleneck that constrains performances of microprocessors. A solution is to utilize SRAMs (Static Random-Access Memory) with faster access speed. However, a storage density of the SRAM is low and its cost is too high. Therefore, SRAM is usually used as a temporary storage on the microprocessor. These temporary storage units are Caches. Cache technology using SRAM largely overcomes the bottleneck of slow access speed to the main memory.

Most modern processor systems adopt Harvard Architecture. At a Primary Level cache (L1 Cache) hierarchy, an instruction cache (I-Cache) and a data cache (D-Cache) are designed to be strictly separate. In a data search operation, the data are directly searched for in the instruction cache or the data cache. If the data could not be found, then it would be further searched for in a Secondary Level cache (L2 Cache). In the field of microprocessor, the cache capacity is very small, usually only a few kilobytes, and some even be only several tens of bytes. The strict separate design of instruction cache and data cache would lead to a low hit ratio of search.

SUMMARY OF THE DISCLOSURE

A technical problem mainly solved by the present disclosure is to provide a data acquisition method, a microprocessor and an apparatus with storage function, thereby improving the success rate of search.

To solve the above-mentioned technical problem, the first technical solution adopted by the present disclosure is to provide a data acquisition method. The data acquisition method includes: a request information for obtaining a target information may be received. The request type of the request information may be an instruction request or a data request. The instruction cache and the data cache may be queried respectively, to determine whether a target information matching with the requested information exists in the instruction cache and the data cache. If the target information does not exist in the cache matching with the request type of the request information, but exists in another cache that does not match with the request type of the request information, then the target information may be returned from the cache that does not match with the request type of the request information. The instruction request may match with the instruction cache. The data request may match with the data cache.

To solve the above-mentioned technical problem, the second technical solution adopted by the present disclosure is to provide a microprocessor. The microprocessor may include a control circuit and a memory coupled with each other. The memory may include an instruction cache and a data cache. The instruction cache and the data cache may each be coupled to the control circuit. The memory may store a program data. The control circuit may execute the program data, to realize: a request information for obtaining a target information may be received. The request type of the request information may be an instruction request or a data request. The instruction cache and the data cache may be queried respectively, to determine whether a target information matching with the requested information exist in the instruction cache and the data cache. If the target information does not exist in the cache matching with the request type of the request information, but exists in another cache that does not match with the request type of the request information, then the target information may be returned from the cache that does not match with the request type of the request information. The instruction request may match with the instruction cache. The data request may match with the data cache.

The advantage of the present disclosure is that the present disclosure provides a data acquisition method distinct from the prior art. The data acquisition method may include the following operations: a request information for obtaining a target information may be received. The request type of the request information may be an instruction request or a data request. The instruction cache and the data cache may be queried respectively, to determine whether there is a target information matching with the requested information in the instruction cache and the data cache. If the target information does not exist in the cache matching with the request type of the request information, but exists in another cache that does not match with the request type of the request information, then the target information may be returned from the cache that does not match with the request type of the request information. The instruction request may match with the instruction cache. The data request may match with the data cache. On the one hand, the present disclosure may physically separate the instruction cache and the data cache from each other. The physically separate architecture may improve the efficiency of data acquisition and reduce the manufacturing complexity of the microprocessor. On the other hand, logically merging the instruction cache and the data cache may be equivalent to expanding the capacity of the primary level cache, thereby improving the cache's hit ratio.

DETAILED DESCRIPTION

Technical solutions in embodiments of the present disclosure will be described clearly and thoroughly in connection with accompanying drawing of the embodiments of the present disclosure. Obviously, the described embodiments are only a part of the embodiments, but not all of them. All other embodiments by a person of ordinary skills in the art based on embodiments of the present disclosure without creative efforts should all be within the protection scope of the present disclosure.

Figure 1:
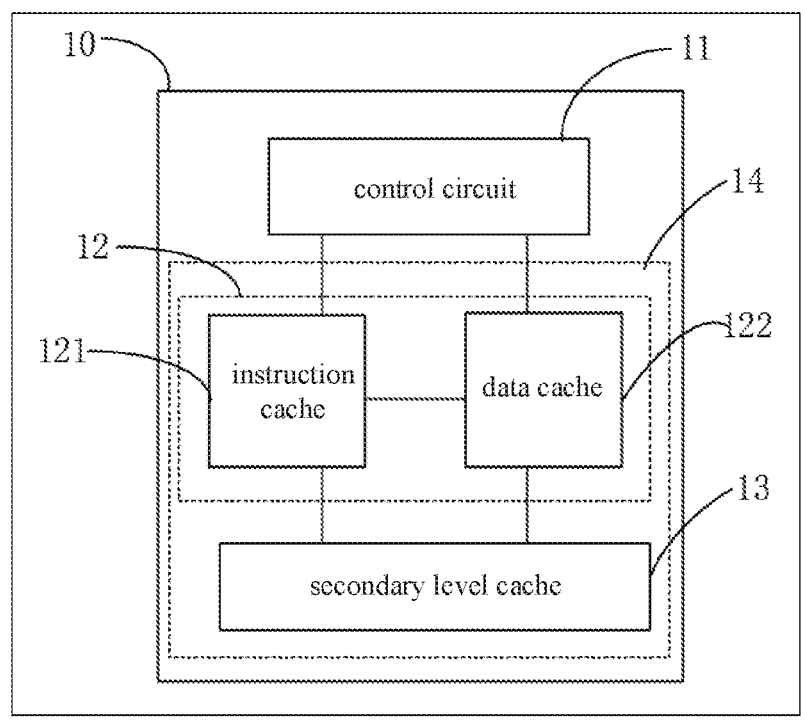
FIG. 1 is a schematic structural diagram of a microprocessor according to an implementation of the present disclosure.

Please referring to FIG. 1, FIG. 1 is a schematic structural diagram of a microprocessor according to an embodiment of the present disclosure.

As is shown in FIG. 1, the microprocessor 10 of the present implementation may include a control circuit 11 and a memory 14 coupled to each other. Program data may be stored on the memory 14. The control circuit 11 may execute the program data to realize the data acquisition method as follows.

The memory 14 of this embodiment may include instruction cache 121 and data cache 122. The instruction cache 121 and the data cache 122 may be respectively coupled to the control circuit 11.

In the present embodiment, the instruction cache 121 and the data cache 122 may be physically independent from each other. The instruction cache 121 may only store instructions. The data cache 122 may only store data. The microprocessor 10 of the present embodiment may remain the form of a Harvard architecture processor and may thus have its advantage that, the separate organization and storage of instructions and data may improve the data acquisition efficiency of the microprocessor 10. In other embodiments, the instructions and the data may also be mixed in the instruction cache 121 and the data cache 122, which is not limited in the present disclosure.

The data cache 122 may refer to a high-speed memory inside a hard disk for temporarily storing some data for reading and re-reading. The instruction cache 121 may refer to a temporary memory. In some embodiments, the instruction cache 121 may be a hardware memory. In some other embodiments, the instruction cache 121 may also be a virtual memory in a form of a software logic.

In the present embodiment, the memory 14 may include two levels of caches, namely a primary level cache 12 and a secondary level cache 13 respectively. The instruction cache 121 and the data cache 122 may both be the primary level cache 12. The instruction cache 121 and the data cache 122 may each be connected to the secondary level cache 13, to obtain instruction or data from the secondary level cache 13. Specifically, the capacity of the secondary level cache 13 may be greater than the capacity of the primary level cache 12. The instructions and the data may be both stored in the secondary level cache 13. Through the provision of two levels of caches, the bottleneck of slow access speed to the main memory may be overcome, and the data acquisition efficiency may be improved. In other embodiments, the microprocessor may also include a level 1 cache, a level 3 cache or more caches, which is not limited in the present disclosure.

In some embodiments, the instruction cache 121 may be provided with a first port (not shown), and the data cache 122 may be provided with a second port (not shown). The instruction cache 121 may obtain an instruction request or a data request through the first port. The data cache 122 may obtain an instruction request or a data request through the second port. In this way, the data cache 121 and the instruction cache 122 may process a same instruction request or a same data request at the same time. Specifically, the control circuit 11 may sequentially issue an instruction request or a data request according to the priority of the instruction request and the data request. The instruction request or data request issued by the control circuit 11 may simultaneously enter the instruction cache 121 and the data cache 122 through the first port and the second port respectively.

In some embodiments, the instruction cache 121 may be provided with the first port and a third port (not shown), the data cache 122 may be provided with the second port and a fourth port (not shown), The instruction cache 121 may obtain an instruction request and a data request through the first port and the third port respectively. The data cache 122 may obtain an instruction request and a data request through the second port and the fourth port respectively. In this way, the instruction cache 121 and the data cache 122 may simultaneously process an instruction request and a data request. Specifically, the control circuit 11 may issue an instruction request and a data request at the same time. The instruction request and the data request may enter the instruction cache 121 through the first port and the third port respectively. At the same time, the instruction request and the data request may also enter the data cache 122 through the second port and the fourth port respectively. Since the instruction cache 121 and the data cache 122 may simultaneously process the data request and the instruction request, the data acquisition efficiency of the microprocessor 10 may be greatly improved.

The instruction cache 121 may further include a prefetch instruction module (not shown), the data cache 122 may further include a prefetch data module (not shown). The control circuit 11 may control the prefetch instruction module to obtain prefetch instructions from the secondary level cache 13 at a preset frequency. The control circuit 11 may control the prefetch data module to obtain prefetch data from the secondary level cache 13 at a preset frequency.

Figure 2:
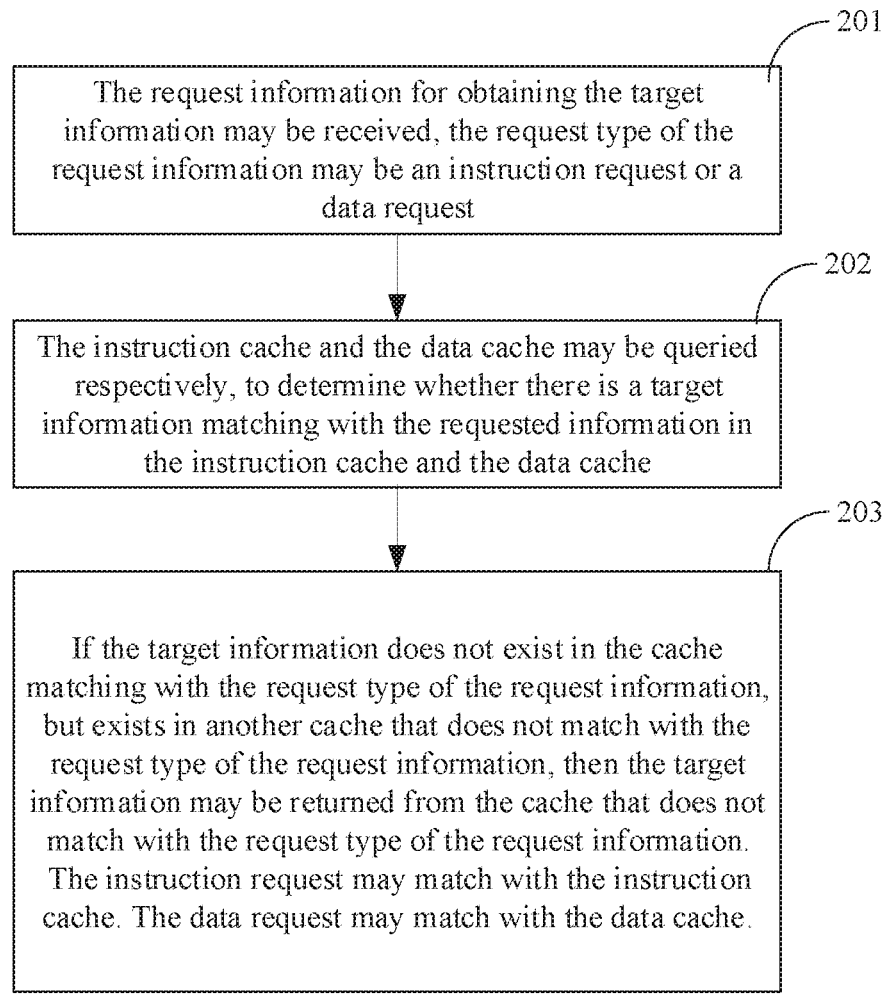
FIG. 2 is a flow chart of a data acquisition method according to an implementation of the present disclosure.

To illustrate the method for reading data by the microprocessor 10 of the present disclosure, please referring to FIG. 2, which is a schematic flowchart of a data reading method according to one embodiment of the present disclosure. In the present embodiment, the microprocessor 10 in FIG. 1 may be taken as an example.

In the present embodiment, the data reading method may include operations illustrated in blocks of FIG. 2.

At block 201: a request information for obtaining a target information may be received. The request type of the request information may be an instruction request a data request.

In the present embodiment, the control circuit 11 may receive the request information for obtaining a target information. The request type of the request information may be at least one of the instruction request or the data request. The control circuit 11 may receive the instruction request or the data request one by one, or the control circuit 11 may simultaneously accept multiple instruction requests and data requests, which is not limited in the present disclosure.

In some embodiments, the request information may include a request instruction and the data information. The control circuit 11 may sequentially send the request information according to the priority level of the request type, and may send it to the instruction cache 121 and the data cache 122 at the same time. The control circuit 11 may sequentially send the instruction request or the data request according to the priority level of the instruction request and the data request. The instruction request or the data request issued by the control circuit 11 may simultaneously enter the instruction cache 121 and the data cache 122. For example, the control circuit 11 issues an instruction request, then the instruction request may enter the instruction cache 121 and the data cache 122 at the same time.

In some embodiments, the control circuit 11 may simultaneously issue an instruction request and a data request. The instruction request and the data request may enter the instruction cache 121 through the first port and the third port respectively. Meanwhile, the instruction request and the data request may also enter the data cache 122 through the second port and the fourth port respectively. Since the instruction cache 121 and the data cache 122 may simultaneously process the data request and the instruction request, the data acquisition efficiency of the microprocessor 10 may be greatly improved.

At block 202: the instruction cache and the data cache may be queried respectively, to determine whether there is a target information matching with the requested information in the instruction cache and the data cache.

In some embodiments, it is determined whether there is an address information same to the address in the instruction cache 121 and the data cache 122. Through a consistency maintenance, it is ensured that contents of data information with the same address are completely consistent. If an address information same to the address is found in the instruction cache 121 and/or the data cache 122, then it may be determined that the instruction cache 121 and/or the data cache 122 stores) the target information matching with the request information. By comparing addresses, the workload of data search may be reduced and the data acquiring efficiency may be improved.

In some embodiments, the target information matching with the request information may be searched for in the instruction cache 121 and the data cache 122 respectively. And it may be determined whether the target information matching with the request information is stored in the instruction cache 121 and the data cache 122. That is, the target information matching with the request information may be searched for in the instruction cache 121 and the data cache 122 at the same time. The search range may be equivalent to the total capacity of the instruction cache 121 and the data cache 122. In the prior art, if the target information is not found in the instruction cache 121 or the data cache 122, the target information may be directly searched for in the secondary level cache 13. That is, the primary level cache 12 actually utilized is only one of the instruction cache 121 and the data cache 122. The capacity of the secondary level cache 13 is larger, and the data acquisition efficiency is low. In the present disclosure, the instruction cache 121 and the data cache 122 may be logically combined. When the target information is being searched for, the instruction cache 121 and the data cache 122 of the primary level cache 12 may both be utilized, thereby improving the efficiency of data acquisition.

In some embodiments, if the request information includes an instruction request and a data request, then it is determined whether the target information matching with the request information is stored in the instruction cache 121 and/or the data cache 122 sequentially according to the priority level of the request type. For example, if the request information is an instruction request, the instruction request may have a higher priority level, then the instruction cache 121 may be preferentially searched to determine whether a target information matching with the request information is stored in it. And if not, then the data cache 122 may be additionally searched. Through a search with priority level, it is possible to avoid increasing the burden of the processor by searching for the target information simultaneously in the instruction cache 121 and the data cache 122.

At block 203: if the target information does not exist in the cache snatching with the request type of the request information, but exists in another cache that does not match with the request type of the request information, then the target information may be returned from the cache that does not match with the request type of the request information. The instruction request may match with the instruction cache. The data request may match with the data cache.

In the present embodiment, if it is determined that the target information does not exist in the cache matching with the request type of the request information, but exists in another cache that does not match with the request type of the request information, then the target information may be returned from the cache that does not match with the request type of the request information.

In some embodiments, if the request information is an instruction request, and the target information does not exist in the instruction cache 121, but exists in the data cache, then the target information may be returned from the data cache 122. If the request information is a data request, and the target information does exist in the data cache 122, but exists in the instruction cache 121, then the target information may be returned from the instruction cache 121.

In some embodiments, if the instruction cache 121 and the data cache 122 both store the target information, then the target information may be returned through a cache matching with the request type of the request information. The instruction request may match with the instruction cache 121. The data request may match with the data cache 122. For example, if the control circuit 11 sends an instruction request, and the instruction cache 121 and the data cache 122 both store the target information. Since the instruction request matches with the instruction cache 121, then the target information may be returned from the instruction cache 121. If the instruction cache 121 or the data cache 122 stores the target information, then the target information may be returned directly from the cache storing the target information. For example, if only the instruction cache 121 stores the target information, then the target information may be returned from the instruction cache 121. If only the data cache 122 stores the target information, then the target information may be returned from the data cache 122.

The present disclosure provides a data acquisition method different from the prior art. The data acquisition method may include the following operations. A request information for obtaining a target information may be received. The request type of the request information may be an instruction request or a data request. The instruction cache and the data cache may be queried respectively, to determine whether there is a target information matching with the requested information in the instruction cache and the data cache. If the target information does not exist in the cache matching with the request type of the request information, but exists in another cache that does not match with the request type of the request information, then the target information may be returned from the cache that does not snatch with the request type of the request information. The instruction request may match with the instruction cache. The data request may match with the data cache. On one hand, the present disclosure may physically separate the instruction cache and the data cache from each other. The physically separate architecture may improve the efficiency of data acquisition and reduce the manufacturing complexity of the microprocessor. On the other hand, logically merging the instruction cache and the data cache may be corresponding to expand the capacity of the primary level cache, thereby improving the cache's hit ratio.

Figure 3:
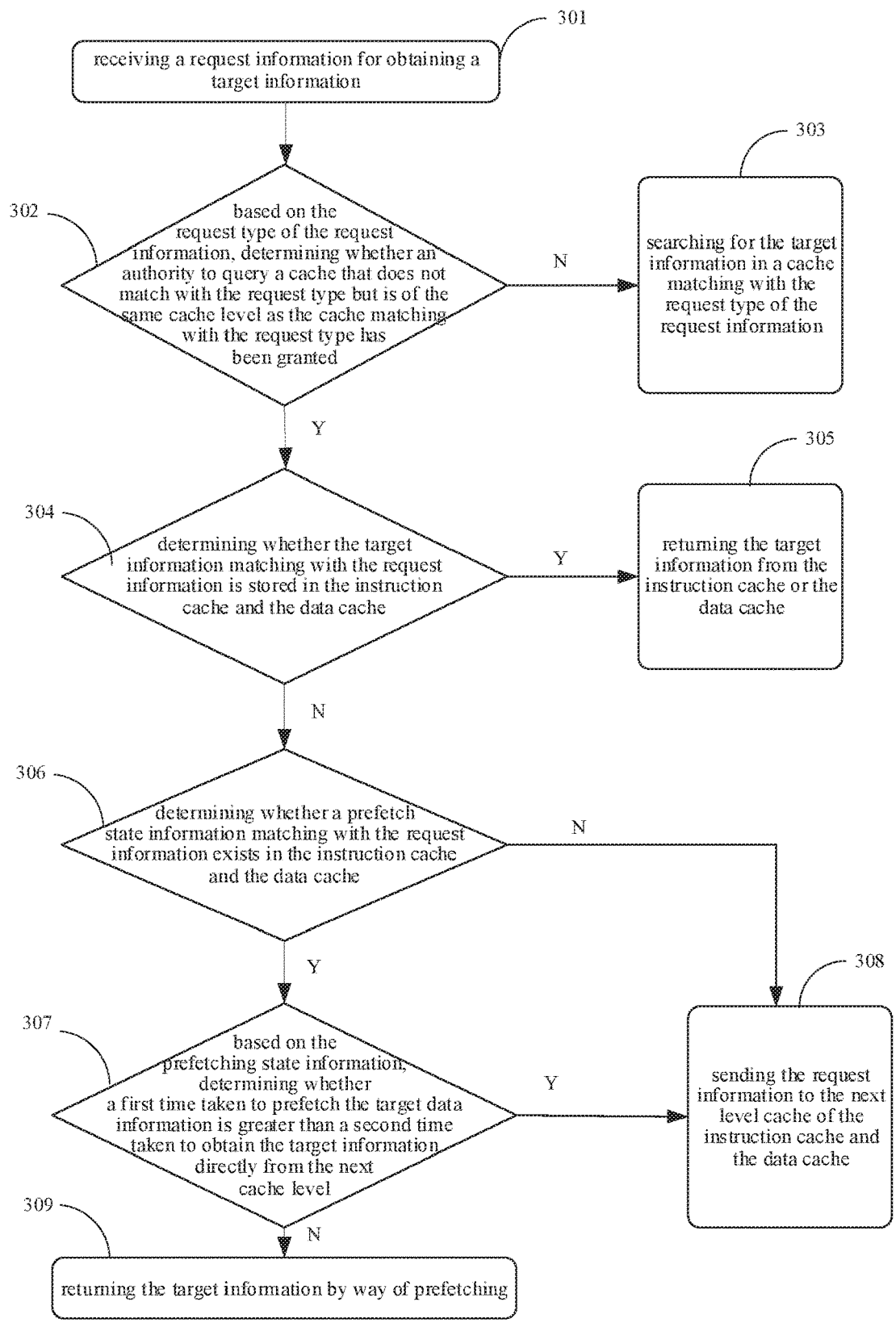
FIG. 3 is a flow chart of a first embodiment of the data acquisition method of FIG. 2.

To illustrate the specific operations of the data acquisition method of the present disclosure, please referring to FIG. 3, FIG. 3 is a schematic flowchart of the first embodiment of the data acquisition method in FIG. 2. In the present embodiment, the microprocessor 10 in FIG. 1 is also taken as an example.

In the present embodiment, the data acquisition method may include operations illustrated in FIG. 3.

At block 301: a request information for obtaining a target information may be received.

In the present embodiment, operation 301 is the same as operation 201 in the previous embodiment, whose details are not repeated here.

At block 302: based on the request type of the request information, it is determined whether an authority to query a cache that does not match with the request type but is of the same cache level as the cache matching with the request type has been granted.

In the present embodiment, upon receipt of the request information for obtaining a target information, first, based on the request type of the request information, it is determined whether the request information has been granted an authority to query a cache that does not match with the request type but is of the same cache level as the cache matching with the request type. If the authority has been granted, then go to block 304. If the authority has not been granted, then go to block 303.

In the present embodiment, the primary level cache 12 may include the instruction cache 121 and the data cache 122. The request information may include the instruction request and the data request. For example, when the control circuit 11 receives an instruction request, the control circuit 11 may only be granted the authority to query the instruction cache 121, but when the control circuit 11 receives an instruction-data request, the control circuit 11 may be granted the authority to query both the instruction cache 121 and the data cache 122. In this case, when the control circuit 11 receives an instruction request and sends it to the primary level cache 12, then the target information may be only searched for in the instruction cache 121. If the target information is not found in the instruction cache 121, then the target information may be searched for in the secondary level cache 13. When the control circuit 11 receives a data request and sends it to the primary level cache 12, then the target information may be searched for in the instruction cache 121 and/or the data cache 122. The specific authority setting may be set based on the concrete situation, and is not limited in the present disclosure. Limiting a query space of the control circuit 11 based on the type of the request information may avoid a too low search speed due to a too large search space.

At block 303: the target information is searched for in a cache matching with the request type of the request information.

In the present embodiment, if it is determined based on the request type of the request information that an authority for querying a cache that does not match with the request type but is of the same cache level as the cache matching with the request type of the request information is granted, then the target information is searched for in a cache matching with the request type of the request information.

At block 304: it is determined whether the target information matching with the request information is stored in the instruction cache and the data cache.

In the present embodiment, if it is determined based on the request type of the request information that an authority for querying a cache that does not match with the request type but is of the same cache level as the cache matching with the request type is granted to the control circuit 11, then the control circuit 11 may determine whether a target information matching with the request type is stored in the instruction cache 121 and the data cache 122.

In the present embodiment, the control circuit 11 may determine whether an address information that is same to the address exists in the instruction cache 121 and the data cache 122. Through consistency maintenance, it is ensured that contents of data information with the same address are completely consistent. By comparing addresses, the workload of data search may be reduced and the data acquiring efficiency may be improved.

In a specific embodiment, the target information matching with the request information may be searched for by the control circuit 11 in the instruction cache 121 and the data cache 122 respectively. And it may be determined whether the target information matching with the request information is stored in the instruction cache 121 and the data cache 122. That is, the target information matching with request information may be searched for in the instruction cache 121 and the data cache 122 simultaneously, thereby improving the data search efficiency.

In another specific embodiment, if the request information includes an instruction request and a data request, then the control circuit 11 may determine whether the target information matching with the request information is stored in the instruction cache 121 and the data cache 122 sequentially according to the priority level of the request type. For example, if the request information is an instruction request, then the target information matching with the request information may be preferentially searched for in the instruction cache 121. And if the instruction cache 121 does not store the target information matching with the request information, then the data cache 122 may be further searched. Through a priority level search, it is possible to avoid an increased burden of the processor that is caused by searching for the target information simultaneously in the instruction cache 121 and the data cache 122.

In yet another specific embodiment, the control circuit 11 may determine whether the target information is stored in the cache matching with the request type of the request information. If yes, then the target information may be returned from the cache matching with the request type of the cache matching. If no, it is determined whether the target information is stored in other caches of the same cache level. That is, the caches may be searched one by one according to the matching degree of the request type of the request information to the caches to find the target information. Searching for the target information based on the matching degree of the request type of the request information to the caches, thereby avoiding an increased burden of the processor when the target information is searched simultaneously in the instruction cache 121 and the data cache 122. Since the request information type matches with the cache, the efficiency of finding the target information may be higher.

In the present embodiment, if the control circuit 11 determines that the instruction cache 121 and/or the data cache 122 store/stores the target information matching with the request information, then go to block 305. If the control circuit 11 determines that the instruction cache 121 and/or the data cache 122 does/do not store the target information snatching with the request information, then go to block 306.

At block 305: the target information may be returned from the instruction cache or the data cache.

In the present embodiment, block 305 is same to block 203 in the previous embodiment, whose details are not repeated here.

At block 306: it is determined whether a prefetching state information matching with the request information exists in the instruction cache 121 and the data cache 122.

The prefetching technology may be based on the overlap of computation and memory access, and may issue a prefetch request before a cache invalidation, such that the data block may be fetched and put into the cache in advance before the data is actually used, so as to avoid a processor pause due to a cache invalidation.

In the present embodiment, if it is determined that the target information matching with the request information is not stored in the instruction cache 121 and the data cache 122, but it is possible for the prefetch information in the instruction cache 121 and the data cache 122 to hit the target, then first of all, it is determined whether a prefetching state information matching with the request information exists in the instruction cache 121 and the data cache 122. Based on the prefetching state information, it may be determined whether the prefetch information matches with the request information.

If the prefetching state information matching with the request information exists in the instruction cache 121 and/or the data cache 122, then it is suggested that useful prefetch information may exist, then go to block 307. If neither the instruction cache 121 nor the data cache 122 stores the prefetching state information matching with the request information, then go to block 308.

At block 307: based on the prefetching state information, it is determined whether a first time taken to prefetch the target data information is greater than a second time taken to obtain the target information directly from the next cache level.

In the present embodiment, if the prefetching state information matching with the request information exists in the instruction cache 121 and/or the data cache 122, then it is suggested that useful prefetch information exists. But if size of the prefetch information is far greater than the target information or in other cases, it is possible that the time taken to obtain the target information by way of prefetching exceeds the time taken to obtain the target information directly from the secondary level cache 13. Therefore, it is necessary to determine whether the first time taken to prefetch the target data information is greater than the second time taken to obtain the target information directly from the next cache level 12.

In the present embodiment, the first time may refer to the time taken by the request information to obtain the target information from a cache that does not match with the request type of the request information and is of the same level as a cache matching with the request type of the request information.

Specifically, when the request type of the request information is a data request, the first time may refer to the time taken by the data request to obtain the target information through the instruction cache. When the request type of the request information is an instruction request, then the first time may refer o the time taken by the instruction request to obtain the target information through the data cache.

In the present embodiment, if the first time is less than or equal to the second time, then go to block 309; if the first time is larger than the second time, then go to block 308.

At block 308: the request information may be sent to the next level cache 12 of the instruction cache 121 and the data cache 122.

In the present embodiment, the control circuit 11 may send the request information to the next level cache 12 of the instruction cache 121 and the data cache 122 based on the type of the request information. If the request information is an instruction request, then the instruction request may be sent to the secondary level cache 13 through the instruction cache 121. If the request information is a data request, then the instruction request may be sent to the secondary level cache 13 through the data cache 122.

At block 309: the target information may be returned by a way of prefetching.

In the present embodiment, if the first time is less than or equal to the second time, then it is suggested that directly returning the target information by way of prefetching is faster. Thus the target information may be returned by way of prefetching.

The present disclosure provides a data acquisition method distinct from the prior art. The data acquisition method may include the following operations: a request information for obtaining a target information may be received. The request type of the request information may include at least one of the instruction request or the data request. It is determined whether the target information matching with the request information is stored in the instruction cache and/or the data cache. If the target information matching with the request information is stored in the instruction cache and/or the data cache, then the target information may be returned by the instruction cache and/or the data cache. On the one hand, the present disclosure may physically separate the instruction cache and the data cache from each other. The physically separate architecture may improve the efficiency of data acquisition and reduce the manufacturing complexity of the microprocessor. On the other hand, logically merging the instruction cache and the data cache may be equivalent to expansion of the capacity of the primary level cache, thereby improving the cache's hit ratio.

Figure 4:
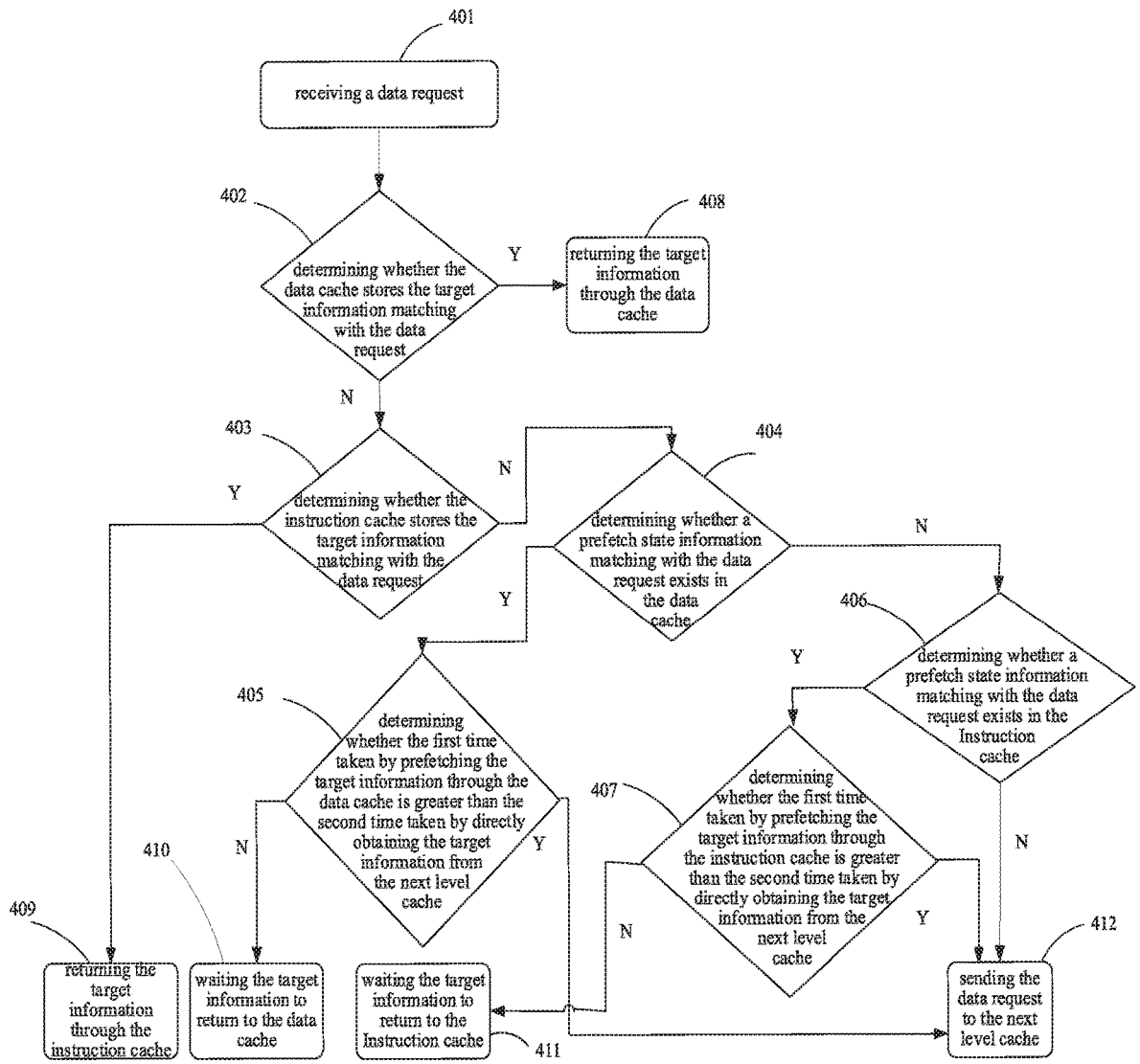
FIG. 4 is a flow chart of a second embodiment of the data acquisition method of FIG. 2.

Please further referring to FIG. 4, FIG. 4 is a schematic flowchart of a second embodiment of the data acquisition method in FIG. 2. It should be noted that in the present embodiment, that the control circuit 11 receives a data request may be taken as an example.

In the present embodiment, the data acquisition method may include operations at blocks illustrated in FIG. 4.

At block 401: a data request may be received.

In the present embodiment, the control circuit may receive a data instruction

At block 402: it is determined whether the data cache stores the target information matching with the data request.

In the present embodiment, since the control circuit 11 receives the data request, and the data request matches with the data cache 122, thus it is firstly determined whether the data cache 122 stores the target information matching with the data request. If the data cache 122 stores the target information matching with the data request, then go to block 408. If the data cache 122 does not store the target information matching with the data request, then go to block 403.

In other embodiments, the order of block 402 and block 403 may be reversed, which is not limited in the present disclosure.

At block 403: it is determined whether the instruction cache stores the target information matching with the data request.

In the present embodiment, it is determined whether the instruction cache 121 stores the target information matching with the data request, if yes, go to block 409, if no, go to block 404.

At block 404: it is determined whether a prefetching state information matching with the data request exists in the data cache.

In the present embodiment, it is determined whether a prefetching state information matching with the data request exists in the data cache 122. If the prefetching state information does exist, then go to block 405. If not, then go to block 406. In other embodiments, the order of block 404 and block 406 may be reversed, which is not limited in the present disclosure.

At block 405: it is determined whether the first time taken by prefetching the target information through the data cache is greater than the second time taken by directly obtaining the target information from the next level cache.

In the present embodiment, it is determined whether the first time taken by prefetching the target information through the data cache 122 is greater than the second time taken by directly obtaining the target information from the next level cache. If the first time taken by prefetching the target information through the data cache 122 is less than or equal to the second time taken by directly obtaining the target information from the next level cache 12, then go to block 410. If the first time taken by prefetching the target information from the data cache 122 is greater than the second time taken by directly obtaining the target information from the next level cache 12, then go to block 412.

At block 406: it is determined whether a prefetching state information matching with the data request exists in the instruction cache.

In the present embodiment, it is determined whether a prefetching state information matching with the data request exists in the instruction cache 121. If the prefetching state information does exist, then go to block 407. If not, then go to block 412.

At block 407: it is determined whether the first time taken by prefetching the target information through the instruction cache is greater than the second time taken by directly obtaining the target information from the next level cache.

In the present embodiment, it is determined whether the first time taken by prefetching the target information through the instruction cache 121 is greater than the second time taken by directly obtaining the target information from the next level cache. If the first time taken by prefetching the target information from the instruction cache 121 is less than or equal to the second time taken by directly obtaining the target information from the next level cache 12, then go to block 411. If the first time taken by prefetching the target information from the instruction cache 121 is greater than the second time taken by directly obtaining the target information from the next level cache 12, then go to block 412.

At block 408: the target information is returned through the data cache.

In the present embodiment, if the target information matching with the data request is stored in the data cache 122, then the target information may be returned directly through the data cache 122, thus there is no need to query the instruction cache 121, thereby reducing the burden of the microprocessor 10 and improving the data acquisition efficiency.

At block 409: the target information is returned through the instruction

In the present embodiment, at this point, only the instruction cache 121 stores the target information, then the target information may be simply returned by the instruction cache 121.

At block 410: the target information returning to the data cache 122 is waited.

In the present embodiment, since the time taken by obtaining the target information through prefetching is less than the time taken by directly obtaining the target information from the next level cache 12, thus it is adequate to wait for the target information to return to the data cache 122. After the target information has returned to the data cache 122, the target information may be accessed from the data cache 122.

At block 411: the target information returning to the instruction cache 121 is waited.

In the present embodiment, since the time taken by obtaining the target information through prefetching is less than the time taken by directly obtaining the target information from the next level cache 12, thus it is adequate to wait for the target information to return to the instruction cache 121. After the target information has returned to the data cache 122, the target information may be accessed from the instruction cache 121.

At block 412: the data request may be sent to the next level cache.

In the present embodiment, the data request may be sent to the next level cache through data cache 122. In other embodiments, the data request may also be sent to the next level cache 12 through the instruction cache 121, which is not limited in the present disclosure.

The present disclosure provides a data acquisition method distinct from the prior art. The data acquisition method may include the following operations: a request information for obtaining a target information may be received. The request type of the request information may include at least one of the instruction request or the data request. It is determined whether the target information matching with the request information is stored in the instruction cache and/or the data cache. If the target information matching with the request information is stored in the instruction cache and/or the data cache, then the target information may be returned by the instruction cache and/or the data cache. On the one hand, the present disclosure may physically separate the instruction cache and the data cache from each other. The physically separate architecture may improve the efficiency of data acquisition and reduce the manufacturing complexity of the microprocessor. On the other hand, logically merging the instruction cache and the data cache may be equivalent to expansion of the capacity of the primary level cache, thereby improving the cache's hit ratio.

Figure 5:
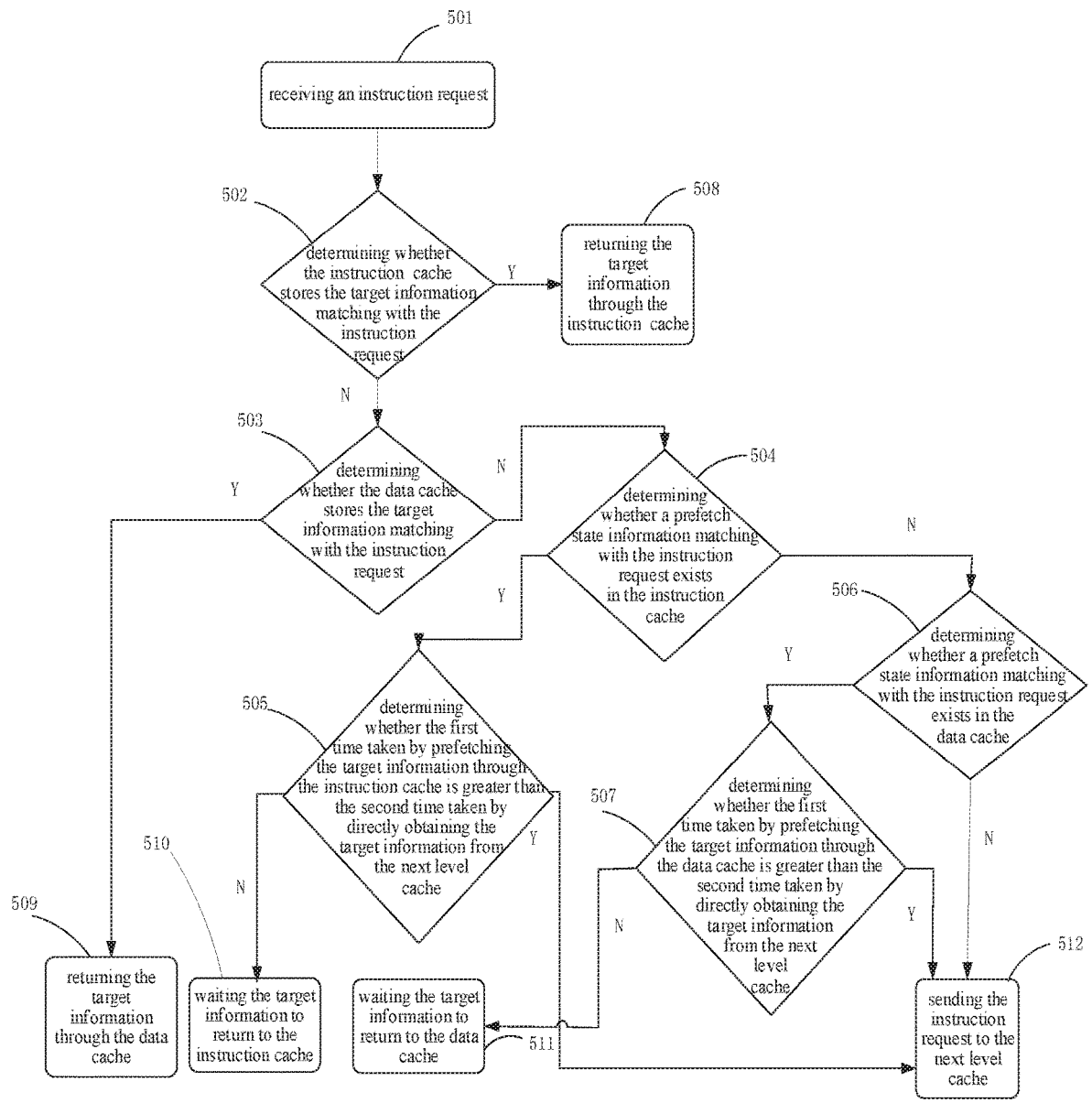
FIG. 5 is a flow chart of a third embodiment of the data acquisition method of FIG. 2.

Please further referring to FIG. 5, FIG. 5 is a schematic flowchart of the third embodiment of the data acquisition method in FIG. 2. It should be noted that in the present embodiment, the control circuit 11 receiving a data request may be taken as an example. The flowchart in the present embodiment is similar to the flowchart in the embodiments of FIG. 4, thus is not repeated here.

The present disclosure may provide a data acquisition method distinct from the prior art. The data acquisition method may include the following operations: a request information for obtaining a target information may be received. The request type of the request information may be an instruction request or a data request. The instruction cache and the data cache may each be queried, to determine whether there is a target information matching with the requested information in the instruction cache and the data cache. If the target information does not exist in the cache matching with the request type of the request information, but exists in another cache that does not match with the request type of the request information, then the target information may be returned from the cache that does not match with the request type of the request information. The instruction request may match with the instruction cache. The data request may match with the data cache. On the one hand, the present disclosure may physically separate the instruction cache and the data cache from each other. The physically separate architecture may improve the efficiency of data acquisition and reduce the manufacturing complexity of the microprocessor. On the other hand, logically merging the instruction cache and the data cache may be equivalent to expansion of the capacity of the primary level cache, thereby improving the cache's hit ratio.

Figure 6:
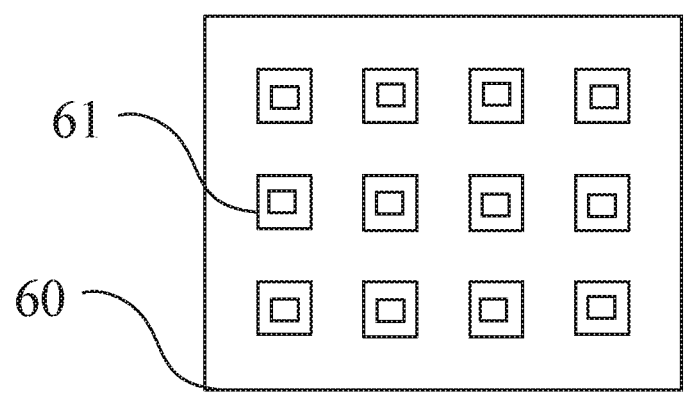
FIG. 6 is a schematic structural diagram of an apparatus with storage function according to an implementation of the present disclosure.

Please referring to FIG. 6, FIG. 6 is a schematic structural diagram of an apparatus with storage function according to one embodiment of the present disclosure.

Please referring to FIG. 6, FIG. 6 is a schematic structural diagram of an apparatus with storage function according to one embodiment of the present disclosure. At least one program or instruction 61 may he stored in an apparatus 60 with storage function, and the program or instruction 61 may be configured to implement any of the above methods. In some embodiments, the apparatus with storage function may include: an U disk, a mobile hard disk drive, a read-only memory (ROM), a random access memory (RAM), a magnetic disk or a CD-ROM and other media that can store program codes.

On the one hand, the present disclosure may physically separate the instruction cache and the data cache from each other. The physically separate architecture may improve the efficiency of data acquisition and reduce the manufacturing complexity of the microprocessor. On the other hand, logically merging the instruction cache and the data cache may be equivalent to expansion of the capacity of the primary level cache, thereby improving the cache's hit ratio.

In the several embodiments provided in the present disclosure, it should be understood that the disclosed method and apparatus may be embodied in other ways. For example, the apparatus embodiments described above are only schematic. For example, the division of modules or units may just be a kind of logical function division. There may be other division manner when the apparatus is actually implemented. For example, multiple units or components may be combined or integrated into another system. Or some features may be ignored or not implemented. In addition, the illustrated or discussed mutual coupling or communication link may be direct coupling or indirect coupling or communication link through some interfaces, apparatuses or units, and may be electrical, mechanical or of other forms.

The units illustrated as separate components may or may not be physically separate, and the components illustrated as units may or may not be physical units. That is, the units may be located in one place or may be distributed on multiple network units. Some or all of the units may be selected as per actual needs to realize the object of the present disclosure.

In addition, all functional units in embodiments of the present disclosure may be integrated into one processing unit, or may be physically separate units, or two or more units may be integrated into one unit. The above-mentioned integrated units may be embodied in the form of hardware units or software functional unit.

If the integrated units are implemented in the form of software functional units and sold or used as independent product, then they could be stored in a computer-readable storage medium. Based on such kind of understanding, the technical solution of the present disclosure may as a whole essentially be embodied in the form of software products, or a part of the technical solution contributing to the prior art or part or all of the technical solution may be embodied in the form of software products. The computer software products may be stored in one storage medium.

The above are only embodiments of the present disclosure, and do not limit the patent scope of the present disclosure. Any equivalent changes to the structure or processes made by the description and drawings of this application or directly or indirectly used in other related technical fields should be encompassed in the protection scope of this application.

What is claimed is:

1. A data acquisition method, comprising:
receiving a request information for obtaining a target information, wherein a request type of the request information is an instruction request or a data request;
querying an instruction cache and a data cache respectively, determining whether the target information matching with the request information exists in the instruction cache and the data cache;
in response to the target information doing not exist in a cache matching with the request type of the request information, and existing in another cache that does not match with the request type of the request information, returning the target information through the cache that does not match with the request type of the request information;
wherein the instruction request matches with the instruction cache, and the data request matches with the data cache.

2. The data acquisition method according to claim 1, wherein the in response to the target information doing not exist in the cache matching with the request type of the request information, and existing in the cache that does not match with the request type of the request information, returning the target information through the cache that does not match with the request type of the request information comprises:
in response to the request information being an instruction request, the target information doing not exist in the instruction cache, and the target information existing in the data cache, returning the target information through the data cache;
in response to the request information being a data request, the target information doing not exist in the data cache, and the target information existing in the instruction cache, returning the target information through the instruction cache.

3. The data acquisition method according to claim 1, further comprising:
in response to the instruction cache and the data cache both storing the target information, returning the target information through the cache matching with the request type of the request information.

4. The data acquisition method according to claim 1, further comprising:
in response to neither the instruction cache nor the data cache storing the target information, determining whether a prefetching state information matching with the request information exists in the instruction cache and the data cache;

in response to the prefetching state information matching with the request information doing not exist in the instruction cache nor in the data cache, sending the request information to a next level cache of the instruction cache and the data cache.

5. The data acquisition method according to claim 4, further comprising:

determining whether a first time of prefetching the target information is greater than a second time of obtaining the target information directly from the next level cache based on the prefetching state information in response to the prefetch information matching with the request information existing in the instruction cache or in response to the prefetch information matching with the request information existing in the data cache or in response to the prefetch information matching with the request information existing in the instruction cache and the data cache;

in response to the first time of prefetching the target information being less than or equal to the second time, returning the target information by way of prefetching;

in response to the first time of prefetching the target information being greater than the second time, sending the request information to the next level cache, to obtain the target information directly from the next level cache;

the first time of prefetching the target information is a time taken by the request information to obtain the target information from a cache that does not match with the request type of the request information and is of the same level as a cache matching with the request type of the request information.

6. The data acquisition method according to claim 1, wherein the querying the instruction cache and the data cache respectively, determining whether the target information matching with the request information exists in the instruction cache and the data cache comprises:

based on the request type of the request information, determining whether the request information has been granted an authority to query a cache that does not match with the request type of the request information and is of the same level as a cache matching with the request type of the request information;

in response to the authority having been granted, executing the querying the instruction cache and the data cache respectively, determining whether the target information matching with the request information exists in the instruction cache and the data cache;

in response to the authority having not been granted, querying the e information from the caches matching with the request type of the request information.

7. The data acquisition method according to claim 1, wherein in response to the requesting information comprising an address of the target information, the determining whether the target information matching with the request information exits in the instruction cache and the data cache comprises:

determining whether an address information identical with the address of the target information exists in the instruction cache and the data cache;

in response to the request information comprising the instruction request and the data request, the determining whether the target information matching with the request information exists in the instruction cache and the data cache comprises:

based on a priority level of the request type, sequentially determining whether the target information matching with the request information exists in the instruction cache and the data cache.

8. A microprocessor, comprising:

a control circuit and a memory coupled with each other, wherein the memory comprises an instruction cache and a data cache, the instruction cache and the data cache are each coupled to the control circuit, the memory stores a program data, the control circuit is configured to execute the program data, to implement a data acquisition method, wherein the data acquisition method comprises:

receiving a request information for obtaining a target information, a request type of the request information is an instruction request or a data request;

querying the instruction cache and the data cache respectively, determining whether the target information matching with the request information exists in the instruction cache and the data cache;

in response to the target information doing not exist n a cache matching with the request type of the request information, and existing in another cache that does not match with the request type of the request information, returning the target information through the cache that does not match with the request type of the request information;

wherein the instruction request matches with the instruction cache, and the data request matches with the data cache.

9. The microprocessor according to claim 8, wherein the instruction cache comprises a first port, the data cache comprises a second port, the instruction cache obtains the instruction request or the data request through the first port, the data cache obtains the instruction request or the data request through the second port, such that the instruction cache and the data cache process a said instruction request or a said data request at the same time.

10. The microprocessor according to claim 9, wherein the instruction cache further comprises a third port, the data cache further comprises a fourth port, the instruction cache obtains the instruction request and the data request through the first port and the third port respectively, the data cache obtains the instruction request and the data request through the second port and the fourth port respectively, such that the instruction cache and the data cache process a said instruction request and a data request he same time.

11. The microprocessor according to claim 8, wherein the in response to the target information doing not exist in the cache matching with the request type of the request information, and existing in the cache that does not match with the request type of the request information, returning the target information through the cache that does not match with the request type of the request information comprises:

in response to the request information being an instruction request, the target information doing not exist in the instruction cache, and the target information existing in the data cache, returning the target information through the data cache;

in response to the request information being a data request, the target information doing not exist in the data cache, and the target information existing in the instruction cache, returning the target information through the instruction cache.

12. The microprocessor according to claim 8, wherein the data acquisition method further comprises:
in response to the instruction cache and the data cache both storing the target information, returning the target information through the cache matching with the request type of the request information.

13. The microprocessor according to claim 8, wherein the data acquisition method further comprises:
in response to neither the instruction cache nor the data cache storing the target information, determining whether a prefetching state information matching with the request information exists in the instruction cache and the data cache;
in response to the prefetching state information matching with the request information doing not exist in the instruction cache nor in the data cache, sending the request information to a next level cache of the instruction cache and the data cache.

14. The microprocessor according to claim 13, wherein the data acquisition method further comprises:
determining whether a first time of prefetching the target information is greater than a second time of obtaining the target information directly from the next level cache of the instruction cache and the data cache based on the prefetching state information in response to the prefetch information matching with the request information existing in the instruction cache or in response to the prefetch information matching with the request information existing in the data cache or in response to the prefetch information matching with the request information existing in the instruction cache and the data cache;
in response to the first time of prefetching the target information being less than or equal to the second time, returning the target information by way of prefetching;
in response to the first time of prefetching the target information being greater than the second time, sending the request information to the next level cache of the instruction cache and the data cache, to obtain the target information directly from the next level cache of the instruction cache and the data cache;
the first time of prefetching the target information is a time taken by the request information to obtain the target information from a cache that does not match with the request type of the request information and is of the same level as a cache matching with the request type of the request information.

15. The microprocessor according to claim 8, wherein the querying the instruction cache and the data cache respectively, determining whether the target information matching with the request information exists in the instruction cache and the data cache comprises:
based on the request type of the request information, determining whether the request information has been granted an authority to query a cache that does not match with the request type of the request information and is of the same level as a cache matching with the request type of the request information;
in response to the authority having been granted, executing the querying the instruction cache and the data cache respectively, determining whether the target information matching with the request information exists in the instruction cache and the data cache;
in response to the authority having not been granted, querying the target information from the caches matching with the request type of the request information.

16. The microprocessor according to claim 8, wherein
in response to the requesting information comprising an address of the target information, the determining whether the target information matching with the request information exits in the instruction cache and the data cache comprises:
determining whether an address information identical with the address of the target information exists in the instruction cache and the data cache;
in response to the request information comprising the instruction request and the data request, the determining whether the target information matching with the request information exists in the instruction cache and the data cache comprises:
based on a priority level of the request type, sequentially determining whether the target information matching with the request information exist in the instruction cache and the data cache.

17. An apparatus with storage function, wherein
the apparatus with storage function stores a program data, the program data is executed to implement a data acquisition method, the data acquisition method comprises:
receiving a request information for obtaining a target information, a request type of the request information is an instruction request or a data request;
querying an instruction cache and a data cache respectively, determining whether the target information matching with the request information exists in the instruction cache and the data cache;
in response to the target information doing not exist in a cache matching with the request type of the request information, and existing in another cache that does not match with the request type of the request information, returning the target information through the cache that does not match with the request type of the request information;
wherein the instruction request matches with the instruction cache, and the data request matches with the data cache.

18. The apparatus according to claim 17, wherein
the in response to the target information doing not exist in the cache matching with the request type of the request information, and existing in the cache that does not match with the request type of the request information, returning the target information through the cache that does not match with the request type of the request information comprises:
in response to the request information being an instruction request, the target information doing not exist in the instruction cache, and the target information existing n the data cache, returning the target information through the data cache;
in response to the request information being a data request, the target information doing not exist in the data cache, and the target information existing in the instruction cache, returning the target information through the instruction cache.

19. The apparatus according to claim 17, wherein
the data acquisition method further comprises:
in response to the instruction cache and the data cache both storing the target information, returning the target information through the cache matching with the request type of the request information.

20. The apparatus according to claim 17, wherein the data acquisition method further comprises:

in response to neither the instruction cache nor the data cache storing the target information, determining whether a prefetching state information matching with the request information exists in the instruction cache and the data cache;

in response to the prefetching state information matching with the request information doing not exist in the instruction cache nor in the data cache, sending the request information to a next level cache of the instruction cache and the data cache.

\* \* \* \* \*